United States Patent
Crawford (10) Patent No.: US 6,549,583 B2
(45) Date of Patent: *Apr. 15, 2003

(54) OPTIMUM PHASE ERROR METRIC FOR OFDM PILOT TONE TRACKING IN WIRELESS LAN

(75) Inventor: James A. Crawford, San Diego, CA (US)

(73) Assignee: Magis Networks, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/790,429

(22) Filed: Feb. 21, 2001

(65) Prior Publication Data

US 2002/0150168 A1 Oct. 17, 2002

(51) Int. Cl.[7] .............................. H04K 1/10; H04J 11/00
(52) U.S. Cl. ...................... 375/260; 375/130; 375/349; 370/206; 370/210
(58) Field of Search .................................. 375/130, 134, 375/137, 144, 145, 148, 149, 226, 260, 326, 327, 340, 341, 349; 370/206, 207, 208, 210

(56) References Cited

U.S. PATENT DOCUMENTS

| | | | |
|---|---|---|---|
| 5,170,415 A | * 12/1992 | Yoshida et al. | 329/304 |
| 5,577,072 A | * 11/1996 | Moon et al. | 375/261 |
| 5,799,047 A | * 8/1998 | Dobrica | 375/350 |
| 5,930,305 A | * 7/1999 | Leib | 329/304 |
| 5,940,450 A | * 8/1999 | Koslov et al. | 375/326 |
| 6,035,003 A | * 3/2000 | Park et al. | 370/208 |
| 6,181,258 B1 | * 1/2001 | Summers et al. | 340/870.02 |
| 6,218,896 B1 | * 4/2001 | Becker et al. | 329/304 |
| 6,310,926 B1 | * 10/2001 | Tore | 375/261 |

FOREIGN PATENT DOCUMENTS

EP    0 822 682 A1   *  2/1998

OTHER PUBLICATIONS

European Telecommunications Standards Institute 2000 (ETSI); "Broadband Radio Access Networks (BRAN); HIPERLAN Type 2; Physical (PHY) Layer"; Technical Specification; http://www.etsi.org ; pp. 1–40; ETSI TS 101 475 V1.1.1 (Apr. 2000).

IEEE Computer Society; "Draft Supplement to Standard [for] Information Technology—Telecommunications and Information Exchange Between Systems—Local and Metropolitan Area Networks—Specific Requirements—Part 11: Wireless LAN Medium Access Control (MAC) and Physical Layer (PHY) Specifications: High Speed Physical Layer in the 5 Ghz Band"; IEEE P802.11a/D7.0; Supplement to IEEE Standard 802.11–1999; (1999); pp. 1–90.

(List continued on next page.)

*Primary Examiner*—Young T. Tse
(74) *Attorney, Agent, or Firm*—Fitch, Even, Tabin & Flannery (57) ABSTRACT

A method and apparatus of pilot phase error estimation in an orthogonal frequency division multiplexed (OFDM) receiver including the steps of: determining pilot reference points corresponding to a plurality of pilots of an OFDM preamble waveform; and estimating an aggregate phase error of a subsequent OFDM data symbol relative to the pilot reference points using complex signal measurements corresponding to each of the plurality of pilots of the subsequent OFOM data symbol and the pilot reference points. For example, a maximum likelihood based estimation is performed using the complex signal measurements and the pilot reference points. Thus, the poor phase performance in a radio portion of the OFDM receiver is compensated for by the pilot phase error estimation in the baseband portion of the OFDM receiver and improved OFDM signal tracking accomplished under poor SNR conditions.

28 Claims, 5 Drawing Sheets

OTHER PUBLICATIONS

Baoguo Yang, et al., "Timing Recovery For OFDM Transmission", IEEE Journal of Selected Areas In Communications, Nov. 2000, pp. 2278–2291, vol. 18, No. 11, IEEE.

JihoOn Choi, et al., "Carrier Frequency Offset Compensation For Uplink Of OFDM–FDMA Systems", IEEE Communications Letters, Dec. 2000, pp. 414–416, vol. 4, No. 12, IEEE.

Dušan Matić, et al., "OFDM Synchronisation Based On The Phase Rotation Of Sub–Carriers", IEEE Journal, 2000, pp. 1260–1264, IEEE.

Stefan A. Fechtel, "Performance Of OFDM Carrier And Sampling Frequency Synchronization On Stationary And Mobile Channels", International Conf. On Consumer Electronics 2000, IEEE Journal, Jun. 13–15, 2000, pp. 18–19, IEEE.

Navid Lashkarian, et al., "Globally Optimum ML Estimation Of Timing And Frequency Offset In OFDM Systems", IEEE Journal, pp. 1044–1048, IEEE.

Hyoung–Kyu Song, et al., "Frequency–Offset Synchronization and Channel Estimation For OFDM–Based Transmission", IEEE Communications Letters, Mar. 2000, pp. 95–97, vol. 4, No. 3, IEEE.

Sébastien Simoens, et al., "A New Method For Joint Cancellation Of Clock And Carrier Frequency Offsets In OFDM Receivers Over Frequency Selective Channels", Center de Recherche Motorola Paris, Espace Technologique Saint–Aubin 99193, Gif–sur Yvette France, pp. 390–394, IEEE VTC2000, IEEE.

Fred Daneshgaran, et al., "ML Symbol Synchronization For Multichannel Modulation: Analysis And Implementation", ECE Department, California State University, Los Angeles, pp. 1–5.

Timothy M. Schmidl, et al., "Robust Frequency And Timing Synchronization For OFDM", IEEE Transactions On Communications, Dec. 1997, pp. 1613–1621, vol. 45, No. 12, IEEE.

Hui Liu, et al., "A High–Efficiency Carrier Estimator For OFDM Communications", IEEE Communications Letters, Apr. 1998, vol. 2, No. 4, pp. 104–106, IEEE.

Keukjoon Bang, et al., "A Coarse Frequency Offset Estimation In An OFDM System Using The Concept Of The Coherence Phase Bandwidth", IEEE, pp. 1135–1139, IEEE.

Paul H. Moose, "A Technique For Orthogonal Frequency Division Multiplexing Frequency Offset Correction", IEEE Transactions On Communications, Oct. 1994, vol. 42, No. 10, pp. 2908–2914, IEEE.

Paul Koufalas, "State Variable Approach To Carrier Phase Recovery And Fine Automatic Gain Control On Flat Fading Channels", Aug. 30, 1996, Submitted to the School of Physics and Electronic Systems Engineering of the Faculty of Information Technology of the University of South Australia for the Degree of Master of Electronic Engineering by Research, University of South Australia.

* cited by examiner

OPTIMUM PHASE ERROR METRIC FOR OFDM PILOT TONE TRACKING IN WIRELESS LAN

BACKGROUND OF THE INVENTION

1. Field of the Invention

The present invention relates generally to orthogonal frequency division multiplexed (OFDM)-based communications, and more specifically to tracking pilot tones of OFDM-based communications to reduce phase noise requirements in the radio portion of an OFDM receiver, as well as provide nearly optimal frequency error tracking performance.

2. Discussion of the Related Art

In wireless local area network (WLAN) applications, multiple devices communicate with each other via OFDM-based radio frequency (RF) wireless links. A common format for such OFDM communication is based upon the IEEE 802.11a standard or the HiperLAN2 standard, for example. Good local oscillator (LO) phase performance in the radio portion of the OFDM transmitters and receivers is critical in such OFDM-based communications when using complex signal constellations, such as 64-QAM and 256-QAM (quadrature amplitude modulation). This is because the symbol rate is chosen to be low enough to combat the severe multipath propagation characteristics that exist like those in indoor wireless applications and this low symbol rate also leads to greater phase noise related performance impairment. For example, in IEEE802.11a and HiperLAN2, the symbol rate is approximately 250 kHz thereby accentuating the need to have excellent phase noise performance in the radio at frequency offsets from the carrier in the vicinity of 250 kHz and less.

Furthermore, the phase of the RF signaling is effected by phase noise generated in the local oscillators (LOs) of both the transmitter and the receiver. Also, phase perturbations are introduced when the transmitter or the receiver moves relative each other and also when the multipath changes, e.g., a door is opened. Unfortunately, poor LO phase noise performance leads to a potentially high symbol error rate, which seriously degrades both the communication range and throughput of the system. For example, in a typical system using IEEE 802.11a, it is estimated that the phase noise interfering with each subcarrier of the OFDM waveform is on the order of 2.7 degrees rms. While this may be acceptable for QPSK and 16-QAM modulations, it is excessive for 64-QAM modulation or higher constellations, resulting in constellation points being easily confused.

Further adding to the problem is the fact that most transmitters and receivers of such wireless products are highly integrated on a single device or chip. As such, the performance of the RF portion of the receiver, for example, is relatively limited. Furthermore, implementing the RF portion of the system to have the desired good phase noise performance that is required for higher order modulations, such as 64-QAM and above, is very difficult when implemented on a single chip with low supply voltages (e.g., 3.3 volts).

SUMMARY OF THE INVENTION

The present invention advantageously addresses the needs above as well as other needs by providing a pilot tracking system utilizing an optimum pilot phase error metric based on a maximum likelihood estimation approach in the baseband processing portion of the OFDM-based receiver to compensate for poor local oscillator performance in the radio portion of the OFDM-based receiver and improve frequency tracking in general.

In one embodiment, the invention can be characterized as a method, and means for accomplishing the method, of pilot phase error estimation in an orthogonal frequency division multiplexed (OFDM) receiver including the steps of: determining pilot reference points corresponding to a plurality of pilots of an OFDM preamble waveform; and estimating an aggregate phase error of a subsequent OFDM data symbol relative to the pilot reference points using complex signal measurements corresponding to each of the plurality of pilots of the subsequent OFDM data symbol and the pilot reference points.

In another embodiment, the invention can be characterized as a pilot phase error metric for an orthogonal frequency division multiplexed (OFDM) receiver including a reference point storage for storing reference points corresponding to each of a plurality of pilots of an OFDM preamble waveform. Also included is a maximum likelihood phase error/weighting processor coupled to the reference point storage for processing complex signal measurements corresponding to each of a plurality of pilots of a subsequent OFDM data symbol in comparison to the reference points from the reference point storage. And a phase error estimator is coupled to the maximum likelihood phase error/weighting processor and is for estimating an aggregate phase error of the OFDM data symbol relative to the pilot reference points from the processed complex signal measurements and the reference points.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is not to be taken in a limiting sense, but is made merely for the purpose of describing the general principles of the invention. The scope of the invention should be determined with reference to the claims.

Figure 1:
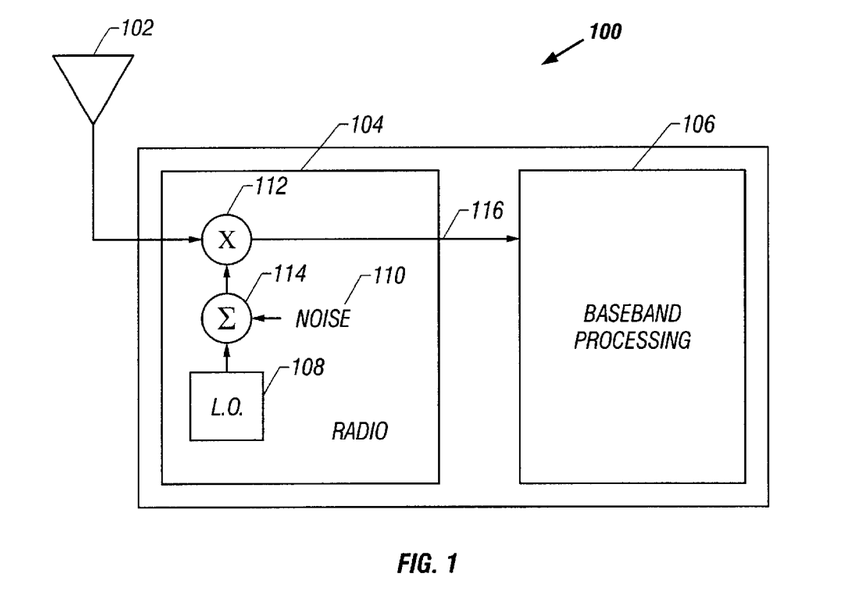
FIG. 1 is a block diagram of an orthogonal frequency division multiplexed (OFDM) receiver illustrating a phase noise contribution of the local oscillators (LO) of the radio portion of the OFDM receiver, and in which one or more embodiments of the invention may be practiced.

Referring first to FIG. 1, a block diagram is shown of an orthogonal frequency division multiplexed (OFDM) receiver illustrating the phase noise contribution of the local oscillators (LO) of the radio portion of the OFDM receiver, and in which one or more embodiments of the invention may be practiced. The OFDM receiver 100 (also referred to as the receiver 100) includes an antenna 102, a radio portion 104 and a baseband processing portion 106. The radio portion 104 includes local oscillators, shown as collectively as local oscillator 108 (hereinafter referred to as LO 108), which introduces phase noise, shown as noise 110, into the receiver 100. The noise 110 is summed with the signals from the local oscillator 108 (illustrated at summer 114) and multiplied with the received signal at mixer 112. As is common, the received signal is converted from RF (radio frequency) to a baseband signal 116 (also referred to as a "baseband I/Q signal") and sent to the baseband processing portion 106. This frequency translation can be done in multiple steps of frequency conversions, but a single conversion is illustrated for simplicity. As such, the baseband signal 116 includes phase noise 110 as introduced by the LO 108 of the radio portion 104 of the OFDM receiver 100. In reality, the baseband signal 116 will also include phase noise as introduced by the local oscillators at the OFDM transmitter that transmits the OFDM signal to the receiver 100 as well as other noise introduced by the channel, e.g., changes in the multipath, movements of the receiver and transmitter relative to each other, and thermal noise.

One solution to reducing the phase noise contribution of the LO 108 is to design a radio portion 104 having good phase noise performance characteristics. However, in such an implementation where the radio portion 104 and the baseband processing portion 106 are integrated on one or more devices (i.e., chips), the design of such a radio portion 104 is difficult and costly, particularly as higher order modulations are used.

In accordance with one embodiment of the invention, the specifications of the radio portion 104 are relaxed such that a certain amount of phase noise 110 introduced by the LO 108 is acceptable. Advantageously and according to one embodiment, the phase noise 110 introduced by the LO 108 is compensated for by the baseband processing portion 106 of the OFDM receiver 100. Thus, the baseband processing portion 106 works to effectively relax the phase noise performance requirements of the radio portion 104, which allows the radio portion 104 to be designed anticipating the poorer phase noise performance. Thus, the radio portion 104 can be implemented more easily and inexpensively. The key to such embodiments is understanding the relationship between both the radio portion 104 and the baseband processing portion 106. A typical approach might be to optimally design the radio portion 104 and then optimally design the baseband processing portion 106. Such an approach leads to a complex and expensive radio portion 104 requiring good phase noise performance. That is, the phase noise introduced by the LO 108 does not need to be further corrected and is sufficient to support signaling at the specified modulations. However, as the modulation constellation increases, for example, moving from 16-QAM to 64-QAM to 256-QAM, less and less phase noise introduced by the LO 108 can be tolerated. Otherwise, with such higher-order constellations, the same phase noise introduced by the LO 108 is more likely to result in constellation points being confused. Thus, as the modulation constellation increases, the specifications of the radio portion 104 become increasingly more stringent. Thus, a radio portion 104 with good phase performance becomes more difficult and expensive to implement as the constellation complexity increases.

However, by relaxing the requirements of the radio portion 104 such that the radio portion 104 contributes phase noise 110 that might otherwise result in constellation point errors (possibly resulting in an unacceptable symbol error rate), a simpler and less expensive radio portion is implemented. Furthermore, advantageously the phase noise contribution of the LO 108 is tracked and removed using a pilot tracking loop employing an optimum maximum likelihood estimator in the baseband processing portion 106 of the receiver 100. Thus, the baseband processing portion 106 effectively reduces the phase noise contribution of the LO 108 of the radio portion 104 without requiring that the radio portion 104 have good phase noise performance. Thus, the baseband processing portion 106 and the radio portion 104 are designed together to provide an integrated OFDM receiver 100 that is easily implementable on a single device and that can support constellations of 64-QAM or higher.

Further details regarding the specific techniques of using the baseband processing portion 106 to effectively reduce the phase noise contribution of the LO 108 of the radio portion 104 are described below.

Figure 2:
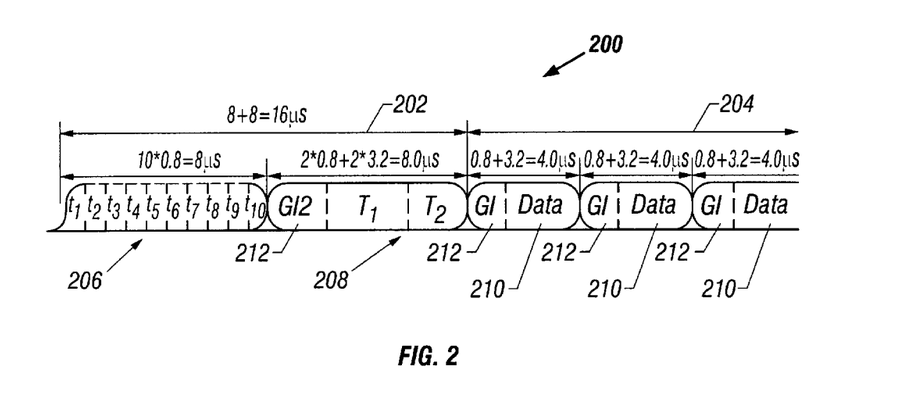
FIG. 2 is a diagram of the PHY-layer frame structure for the IEEE 802.11a standard used in OFDM communications, for example, by the OFDM receiver of FIG. 1.

Referring next to FIG. 2, a diagram is shown of the PHY-layer frame structure for the 802.11a standard used in OFDM communications, for example, by the OFDM receiver 100 of FIG. 1. Shown is a frame 200 having a preamble 202 and a data portion 204. The preamble 202 includes a short symbol portion 206 including 10 short symbols ($t_1$–$t_{10}$) and a long symbol portion 208 including two long symbols ($T_1$ and $T_2$). The data portion 204 includes multiple data symbols 210 (also referred to as OFDM symbols or simply symbols). Each long symbol $T_1$ and $T_2$ and each data symbol 210 having a guard time interval 212 preceding it. The frame 200 is also referred to as a PHY-layer frame or a medium access control (MAC) frame.

According to these standards, the preamble 202 is chosen which is well suited to measuring frequency errors quickly in the communication system, but is substantially less ideal for measuring precision time of signal arrival. As is well known in the art, the short symbol portion 206 is used for signal detection, diversity selection, coarse frequency offset estimation, and timing synchronization. The long symbol portion 208 is used for channel estimation and fine frequency offset estimation. Following the preamble 202, each OFDM symbol 210 consists of a properly time-windowed set of modulated subcarriers (e.g., sine waves) and a guard time interval 212. As is well known in the art, this guard time interval 212 is utilized to allow the communication channel's transient to decay before transmitting the next OFDM symbol 210. According to the IEEE 802.11a standard, this guard time interval 212 is 0.8 µs and the symbol 210 length is 3.2 µs. Note that the guard time interval in the long symbol portion 208 is twice the duration of that preceding each data symbol 210, i.e., 1.6 µs. According to the HiperLAN2 standard, the guard time interval 212 is selectable between 0.4 µs or 0.8 µs while the symbol 210 length is 3.2 µs. As such, the guard time interval 212 is long enough such that all reflections of the transmitted symbol 210 are adequately reduced prior to transmission of the next OFDM symbol 210.

As is well known in the IEEE 802.11a and the HiperLAN2 waveforms, each symbol, whether the data symbol 210 or one of the long symbols $T_1$ and $T_2$, includes 48 data bearing subcarriers and a plurality of pilot subcarriers (also referred to as "pilot tones" or simply as "pilots") buried within the signal that do not transport data, e.g., 4 pilots in the IEEE 802.11a and HiperLAN2 waveforms. According to the IEEE 802.11a standard, these pilots occupy subcarrier positions ±7 ΔF and ±21 ΔF of each symbol. As such, the phase behavior of the pilots is precisely known aside from channel related impairments and LO phase noise. Since the phase noise imposed on these pilot tones is the same phase noise that is imposed upon all of the subcarriers, it is possible to mitigate much of the LO phase noise by phase tracking these pilots. However, since finite signal-to-noise ratio (SNR) at the OFDM receiver input also contributes phase noise to all of the subcarriers, the effective noise bandwidth of the tracking algorithm can not be made arbitrarily large. Rather, the bandwidth of the tracking algorithm must be based upon a compromise between LO-related phase noise suppression and additive noise due to the finite input SNR.

According to one embodiment of the invention, during the long symbols T1 and T2 of the long symbol portion 208, complex signal measurements are taken for each pilot tone and stored in rectangular form as a respective pilot reference point for each pilot tone of the MAC frame 200. Then, an optimum pilot phase error metric of a pilot tracking loop processes complex signal measurements for all of the pilots of each subsequent data symbol 210 along with the pilot reference points to produce an estimate of the aggregate phase error of the current OFDM data symbol as compared to the actual phase at the beginning of the MAC frame 200. The pilot phase error metric is guided by a maximum likelihood estimation approach in how the complex signal measurements of the pilots and the pilot reference points are combined. Advantageously, this embodiment estimates the aggregate phase error of the data symbol without having to explicitly calculate the amplitude and phase of the individual pilots in the long symbol portion 208 or calculate the amplitude and phase of the individual pilots of each data symbol 210. Next, the estimation of the aggregate phase error of the current data symbol is then fed back through a loop filter and used to rotate the phase of the incoming baseband IQ signal for the next OFDM data symbols so that they will be received with an improved phase error. This maximum likelihood estimation-based approach in the pilot phase error metric is a departure from a conventional methods in that it tracks the pilot aggregate of the data symbol, rather than tracking the strongest of the plurality of pilots of the data symbol. Thus, the maximum likelihood pilot phase error metric compensates for the poor phase noise performance of the radio portion of the OFDM receiver. A natural by-product of the maximum likelihood metric is that it also maximizes the effective SNR for the pilot symbols considered as a whole. The additional SNR permits greater suppression of the LO phase noise by these disclosed techniques.

Figure 3:
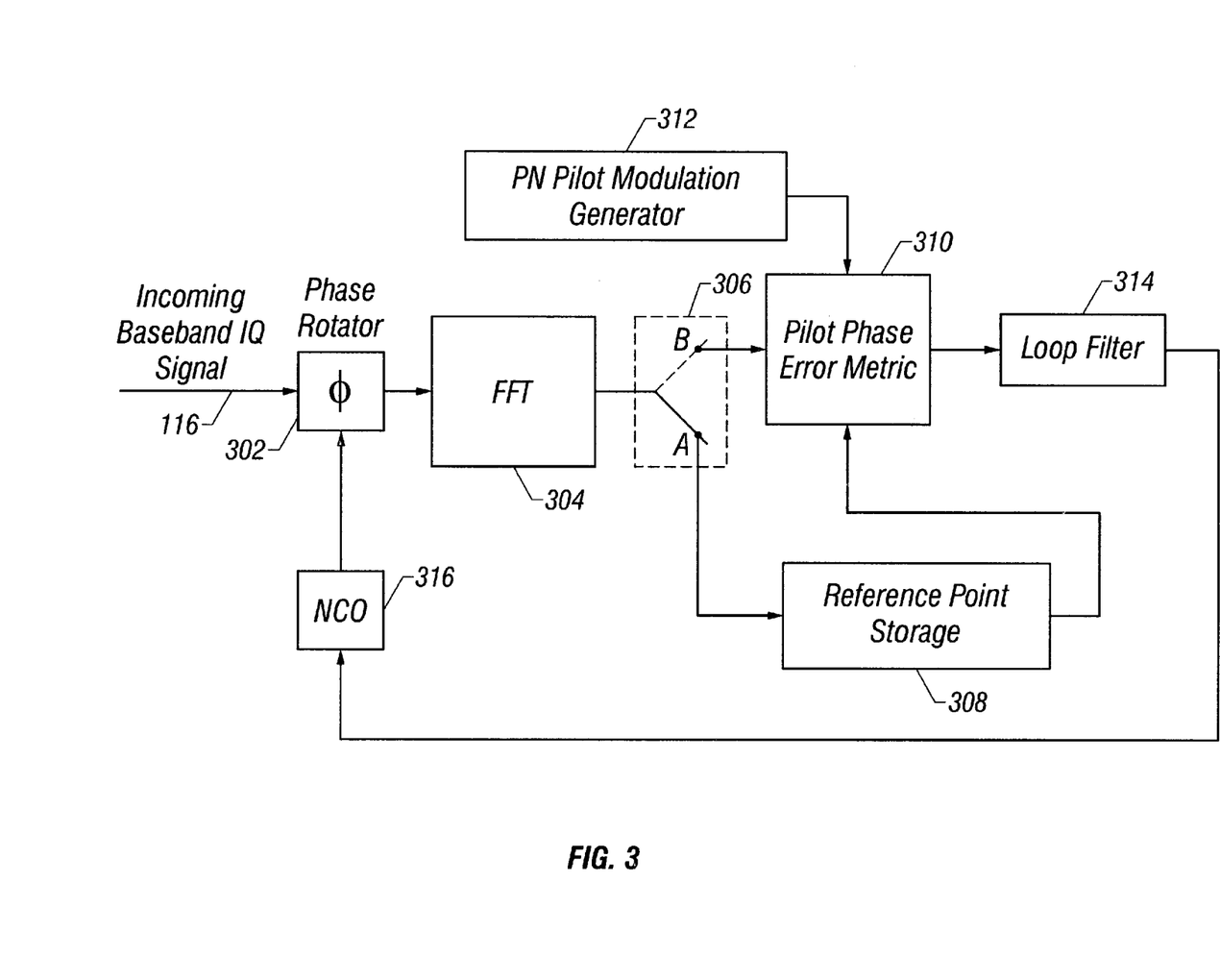
FIG. 3 is a functional block diagram of a pilot tracking loop of a baseband processing portion of the OFDM receiver of FIG. 1, which utilizes a pilot phase error metric based on a maximum likelihood estimation approach for estimating the phase error of OFDM data symbols in accordance with one embodiment of the invention.

Referring next to FIG. 3, a functional block diagram is shown of a pilot tracking loop of the baseband processing portion of the OFDM receiver of FIG. 1, which utilizes a pilot phase error metric based on a maximum likelihood estimation approach for estimating the phase error of OFDM data symbols in accordance with one embodiment of the invention. Shown is the incoming baseband IQ signal 116, a phase rotator 302, an FFT 304 (fast Fourier transform, which may be referred to generically as a "Fourier transform"), a switch 306 having positions A (solid line) and B (dashed line), a reference point storage 308, a pilot phase error metric 310, a pseudo random pilot modulation generator 312 (hereinafter referred to as a PN pilot modulation generator 312), a loop filter 314, and an NCO 316 (numerically controlled oscillator, which may be referred to generically as an "oscillator").

The incoming baseband IQ signal 116 is input to the phase rotator 302. The phase rotator 302 is coupled to the FFT 304, which is coupled to the switch 306. In position A, the switch 306 is coupled to the pilot reference storage 308, which is coupled to the pilot phase error metric 310. In position B, the switch 306 is directly coupled to the pilot phase error metric 310. The PN pilot modulation generator 312 is also coupled to the pilot phase error metric 310. Additionally, the loop filter 314 couples the pilot phase error metric 310 to the NCO 316 and the NCO 316 is coupled back to the phase rotator 302.

In operation, the pilot tracking loop (also referred to as a phase-locked loop) is used to track all of the plurality of pilots for each symbol in order to estimate a phase error for each data symbol and then used to correct or minimize the phase error for subsequent data symbols. Initially, the pilot tracking loop determines reference points or each of the respective pilots since the amplitudes and phases of the received pilots are completely unknown and may vary from pilot to pilot within each symbol due to the multipath and the time of arrival. The pilots of the long symbols T1 and T2 of the OFDM preamble waveform are used to determine the reference points. As such, when the long symbols of the incoming baseband signal 116 pass through the phase rotator 302, they are unchanged in phase since the pilot tracking loop is not yet activated, i.e., the switch 306 is in position A. During the long symbol portion of the preamble, a channel estimate is made by the FFT 304 and saved, e.g., the complex signal measurements I+jQ for each pilot are extracted at the FFT 304 and saved in the reference point storage 308. The reference points for each pilot are saved in rectangular form as $u_k$ and $v_k$ (where k=0,1,2 and 3), which represent the I (in-phase) and Q (quadrature) values, respectively, for each reference point. During this time (i.e., when the switch 306 is in position A), the NCO 316 is preset to the proper initial conditions and the loop filter 314 updating is disabled.

After the pilot reference points $u_k$ and $v_k$ are determined for each pilot using the FFT 304, the subsequent data symbols of the incoming baseband signal 116 are processed by the FFT 304 one at a time. The switch 306 is now moved to position B, which activates the pilot tracking loop. The outputs of the FFT 304, i.e., complex signal measurements, corresponding to each of the pilots of the current data symbol are input to the pilot phase error metric 310 which is guided by an optimum maximum likelihood estimation approach using each of the pilots of the data symbol as compared to the respective stored reference points $u_k$ and $v_k$ for each pilot. The result of the pilot phase error metric 310 is an aggregate phase error estimate over the respective data symbol. As previously mentioned, in this embodiment, the pilot phase error metric 310 advantageously uses all of the pilots to produce its estimate. It is important that all of the pilots of each data symbol are tracked in order to mitigate the effect of frequency selective fading over the frequency range of the OFDM data symbol.

The loop filter 314 is updated based upon the output of the pilot phase error metric 310. The loop filter 314 then modifies the NCO 316 which causes the phase rotator 302 to de-rotate the incoming baseband signal 116 to keep the aggregate phase error as low as possible. The loop filter 314 and the NCO 316 are well known components that may be found in many phase-locked loops as known in the art.

Additionally, as is well known, the PN pilot modulation generator 312 provides the pseudo random number sequence to remove the random BPSK (binary phase shift keying) modulation applied to each of the pilot tones.

The pilot tracking loop includes phase rotator 302 for receiving and phase de-rotating the incoming baseband signal 116, the switch 306, the reference point storage 308, the pilot phase error metric 310, the loop filter 314, and the NCO 316 while advantageously utilizing the FFT 304 which is required within the OFDM receiver. It is also noted that in this embodiment, the phase rotator 302 is provided before the FFT 304 in the receiver such that the phase error is corrected prior to the FFT 304 operation.

Figure 4:
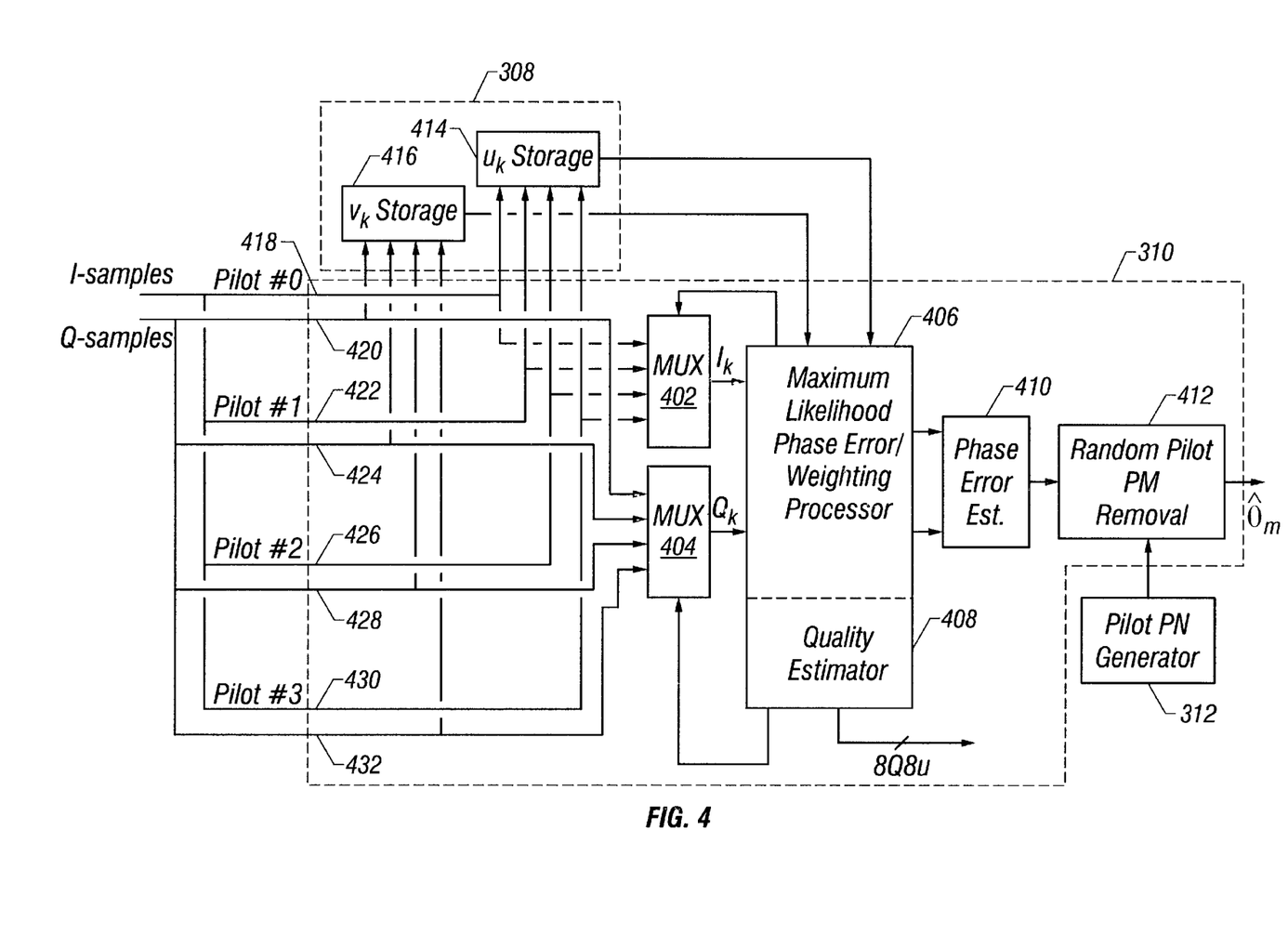
FIG. 4 is a functional block diagram of a pilot phase error metric of the pilot tracking loop of FIG. 3 which is based upon maximum likelihood estimation in accordance with one embodiment of the invention.

Referring next to FIG. 4, a functional block diagram is shown of the pilot phase error metric of the pilot tracking loop of FIG. 3 which is based upon maximum likelihood estimation in accordance with one embodiment of the invention. Shown is the pilot phase error metric 310 including multiplexers 402 and 404, a maximum likelihood phase error/weighting processor 406, a quality estimator 408, a phase error estimator 410, and a random pilot modulation removal 412. Also shown are the PN pilot modulation generator 312 and the reference point storage 308 which includes a Uk storage 414 and a $v_k$ storage 416. Input I and Q samples from the FFT 304 for the respective pilots of the OFDM data symbols are illustrated as signals 418 and 420 for pilot #0, signals 422 and 424 for pilot #1, signals 426 and 428 for pilot #2, and signals 430 and 432 for pilot #3.

Again, as the long symbol portion of the incoming baseband signal 116 is processed by the FFT, the frequency bins of the FFT that correspond to the four pilots of the long symbols are saved as $u_k$ and $v_k$ within the $u_k$ storage 414 and the $v_k$ storage 416, where k=0,1,2 and 3. Thus, $u_k$ and $v_k$ are complex signal measurements in rectangular form for each pilot that represent the reference points in IQ space for each of the four pilots (i.e., pilot #0, pilot #1, pilot #2 and pilot #3). These pilot reference points are saved for use in the maximum likelihood phase error/weighting processor 406.

The information from the FFT operation can be represented as $A_k$ (amplitude of the $k^{th}$ pilot subcarrier) and $\theta_k$ (phase of the $k^{th}$ pilot subcarrier). If the discontinuous nature of the OFDM symbol subcarriers is ignored, the $k^{th}$ pilot tone can be represented as:

$$r_k(t) = A_k s_k(t) e^{j\theta_k(t)} + n_k(t) \quad \text{Eq. (1)}$$

where $r_k(t)$ is the received signal, $s_k(t)$ is the transmitted signal and $n_k(t)$ represents complex Gaussian noise having a two-sided power spectral density of $N_o/2$ W/Hz. Thus, the beginning of the pilot-bearing OFDM signal train for a given OFDM symbol and pilot tone is represented as:

$$r_k(0) = A_k s_k(0) e^{j\theta_k(0)} + n_k(0) = u_k + j v_k \quad \text{Eq. (2)}$$

Next, after having stored the reference points, the pilot phase tracking loop is activated, e.g., the switch 306 of FIG. 3 is moved to position B. During the subsequent data portion of the MAC frame, each $r_k(t)$ changes with time from data symbol to data symbol over the frame structure. Generally, it is desired to track the pilots having a larger amplitude because they are less influenced by the additive Gaussian noise of the receive channel, and also the channel phase near frequency-selective spectrum nulls will be erratic. Thus, the sampled tracking loop tracks the nominal pilot subcarrier phase departure from the phase of the reference point at the beginning of the frame structure for each pilot.

As such, the pilot tracking loop is activated and the complex signal measurements (Is and Qs) from the FFT corresponding to each of the respective pilots #0 through #3 for each subsequent data symbol are coupled to the respective one of multiplexers 402 and 404 to be input into the maximum likelihood phase error/weighting processor 406. It is noted that the pilot reference points are stored in rectangular form as $u_k$ and $v_k$ and that the amplitude and phase of each of the pilot reference points is not actually calculated. It is also noted that the subsequent data symbol by data symbol complex signal measurements of the in-phase and quadrature terms for the same pilot tones during the rest of the burst reception are labeled as $I_{k,m}$ and $Q_{k,m}$, where m is the data symbol time index. For example, the $I_{k,m}$ values from the FFT operation for each data symbol are coupled to multiplexer 402 while the $Q_{k,m}$ values from the FFT operation for each data symbol are coupled to multiplexer 404. The multiplexers 402 and 404 function to buffer the $I_{k,m}$ and $Q_{k,m}$ values to the maximum likelihood phase error/weighting processor 406. Thus, the maximum likelihood phase error/weighting processor 406 serially processes one set of $I_{k,m}$ and $Q_{k,m}$ values at a time such that redundant gates are not required to simultaneously perform the steps in the maximum likelihood phase error/weighting processor 406 in parallel.

The initial relative phase of each pilot subcarrier at the beginning of the frame can be largely removed by modifying $r_k(t)$ of Eq. (1) for t>0 per $$rm_k(t) = r_k(t) e^{-j\theta_k(0)} \quad \text{Eq. (3)}$$

where $rm_k(t)$ represents the $k^{th}$ pilot after removal of the phase initial estimate for the particular pilot during the long symbol portion of the preamble. Substituting Eq. (3) in Eq. (1):

$$n_k(t) = rm_k(t) - A_k s_k(t) e^{j[\theta_k(t) - \theta_k(0)]} = rm_k(t) - A_k s_k(t) e^{j\phi_e(t)} \quad \text{Eq. (4)}$$

where $\phi_e$ is the actual pilot phase error of the $k^{th}$ pilot of the data symbol relative to the pilot reference point, which is not explicitly calculated, but is assumed to be the same for all of the pilots of a given data symbol. In the OFDM waveform, the MAC frame time duration is purposely chosen such that the channel characteristics change very little over an individual MAC frame. Therefore, for a specific MAC frame, it is assumed that $|A_k s_k(t)| = A_k$, a constant.

Thus, while the amplitudes of the individual pilots may be different from each other, the amplitude of each pilot $(A_k)$ from symbol to symbol will stay approximately constant over the course of the MAC frame. Since the pilot tracking loop of this embodiment primarily tracks phase rather than signal amplitude, some error in signal amplitude is acceptable.

The probability density function for an individual noise sample nk is given by $$pdf(n_k) = \frac{1}{2\pi\sigma^2} \exp\left\{-\frac{n_{kc}^2 + n_{ks}^2}{2\sigma^2}\right\} \quad \text{Eq. (5)}$$

where $n_{kc}$ and $n_{ks}$ are the real and imaginary parts of the $k^{th}$ bin noise sample $n_k$ and $\sigma$ is the standard deviation of the Gaussian noise. Computing the log-likelihood function from Eq. (5), and then maximizing it, the maximum-likelihood estimator for the actual pilot phase error $\theta$ for a data symbol is given by:

$$\hat{\theta} = \tan^{-1}\left\{\frac{\sum_k A_k Im(rm_k)}{\sum_k A_k Re(rm_k)}\right\} \quad \text{Eq. (6)}$$

where $\hat{\theta}$ is the estimate of the aggregate pilot phase error of a data symbol relative to the reference points looking at all of the pilots of the data symbol together.

Generally, the sum $$\sum_k A_k^2$$

will be nearly equal to a constant due to the AGC (automatic gain control) action that precedes the A/D converter in the baseband processing portion. If the receive channel is flat (i.e., no frequency selective fading present), then the $A_k$ terms will all have the same value and Eq. (6) reduces to the classical maximum-likelihood estimator that is commonly seen for carrier phase.

In rectangular form instead of polar form, the complex signal measurements corresponding to the $k^{th}$ pilot of the $m^{th}$ data symbol are represented as:

$$r_{k,m} = I_{k,m} + jQ_{k,m} \quad \text{Eq. (7)}$$

where $k=0,1,2$ and $3$. The phase rotation for the $k^{th}$ pilot that must be applied to remove the phase argument as computed by the channel estimation process (i.e., the storage of $u_k$ and $u_k$) can be expressed as:

$$e^{-j\theta_k(0)} = \frac{u_k - jv_k}{\sqrt{u_k^2 + v_k^2}} \quad \text{Eq. (8)}$$

where $e^{-j\theta_k(0)}$ is found in Eq. (3). Thus, $rm_{k,m}$ for the $m^{th}$ data symbol becomes:

$$rm_{k,m} = (I_{k,m} + jQ_{k,m})\left(\frac{u_k - jv_k}{\sqrt{u_k^2 + v_k^2}}\right) \quad \text{Eq. (9)}$$

where $rm_{k,m}$ represents the signal measurement of the $k^{th}$ pilot after removal of the phase initial estimate, which is not explicitly calculated.

According to this embodiment of the maximum likelihood estimation guided approach which tracks all of the pilots of the OFDM data symbol, each pilot signal contribution of Eq. (9) is then weighted by the signal amplitude $A_k$ of the $k^{th}$ pilot. Even though the amplitudes $A_k$ are time varying, they generally do not vary over the duration of the MAC frame such that $A_k(t)$ approximates the $A_k$ measurement at the beginning of the MAC frame, e.g., from the reference points $u_k+jv_k$ of the long symbol duration. Thus, the amplitude to weight each of the pilot contributions is given by:

$$A_k(t) \approx A_k(0) = \sqrt{u_k^2 + v_k^2} \quad \text{Eq. (10)}$$

Multiplying Eq. (9) by Eq. (10), the quantity $A_k rm_{k,m}$ is a complex signal given by:

$$A_k rm_{k,m} = [u_k I_{k,m} + v_k Q_{k,m}] + j[u_k Q_{k,m} - v_k I_{k,m}] \quad \text{Eq. (11)}$$

Summing the each of the complex signals $A_k rm_{k,m}$ for the k pilots produces a complex composite signal looking at all of the pilots of a data symbol together and is given by:

$$\sum_{k=0}^{3} A_k rm_{k,m} = \sum_{k=0}^{3} [(u_k I_{k,m} + v_k Q_{k,m}) + j(u_k Q_{k,m} - v_k I_{k,m})] \quad \text{Eq. (12)}$$

Thus, based upon Eq. (6), the aggregate phase error estimate for the $m^{th}$ data symbol, $\hat{\theta}_m$, is the argument of the complex composite signal for all pilots together, $$\sum_{k=0}^{3} A_k rm_{k,m},$$

which is represented mathematically by:

$$\hat{\theta}_m = \arg\left(\sum_{k=0}^{3} A_k rm_{k,m}\right) \quad \text{Eq. (13)}$$

It is noted that Eq. (13) must be adjusted to deal with the random bi-phase modulation of the pilot subcarriers during the frame; however, the quantity in Eq. (13) is the estimate that is produced by the pilot phase error metric, and is further shown in more detail below as Eq. (14).

The argument of the complex composite signal (i.e., Eq. (13)) is determined by the phase error estimator 410 and is based upon the maximum likelihood estimation approach of Eq. (6), which is re-written below in Eqs. (14) through (16). Preferably, using a cordic-based arctangent method on the real and imaginary parts of the complex composite signal in the phase error estimator 410, the output of the phase error estimator 410 is given by Eq. (14). In alternative embodiments, making use of the small angle approximation within the phase error estimator 410, Eq. (14) can be recast as Eqs. (15) and (16):

$$\hat{\theta}_m = \tan^{-1}\left[\frac{\sum_{k=0}^{3}(u_k Q_{k,m} - v_k I_{k,m})}{\sum_{k=0}^{3}(u_k I_{k,m} + v_k Q_{k,m})}\right] \quad \text{Eq. (14)}$$

$$\cong \sin^{-1}\left[\frac{\sum_{k=0}^{3}(u_k Q_{k,m} - v_k I_{k,m})}{\sum_{k=0}^{3}(u_k I_{k,m} + v_k Q_{k,m})}\right] \quad \text{Eq. (15)}$$

$$\approx \frac{\sum_{k=0}^{3}(u_k Q_{k,m} - v_k I_{k,m})}{\sum_{k=0}^{3}(u_k I_{k,m} + v_k Q_{k,m})} \quad \text{Eq. (16)}$$

where $\hat{\theta}_m$ is the aggregate phase p error of the $m^{th}$ data symbol. Thus, the maximum likelihood/weighting processor 406 calculates the quantities in the numerator and the denominator of Eqs. (14) through (16) while the quantity $\hat{\theta}_m$ of Eqs. (14) through (16) is determined in the phase error estimator 410. The quantities in the numerator and the denominator or Eqs. (14) through (16) are weighted averages producing composite I and Q signals that represent the deviation of the pilots of the current data symbol compared to the reference points measured at the beginning of the frame.

With the AGC present and the fact that the actual pilot phase error $\theta$ for a data symbol will be kept small by the pilot tracking loop, it can suffice to use the small angle approximation and use only the numerator portion of Eq. (6) for the pilot tone phase error metric as $$\hat{\theta} \approx \sum_k A_k \text{Im}(rm_k) \qquad \text{Eq. (17)}$$

Again, it is noted that the random bi-phase modulation applied to the pilots at the OFDM transmitter is removed by the random pilot modulation removal 412, which uses a pseudo random sequence which is known a priori from the PN pilot modulation generator 312. Thus, the output of the random pilot modulation removal 412 is the aggregate phase error of the processed data symbol, $(\hat{\theta})_m$.

As previously described, the multiplexers 402 and 404 buffer the I and Q samples for each pilot of the symbol received from the FFT operation. Thus, when the maximum likelihood phase error/weighting processor 406 calculates the numerator and denominator of Eqs. (14) through (16), it only processes one pilot at a time. This reduces the overall gate count in a design implemented in a chip. Additionally, all calculations done within the maximum likelihood phase error/weighting processor 406 are done in rectangular form, instead of in polar form, for simplification reasons.

As shown above, advantageously, the pilot phase error metric 310 does not actually calculate the amplitude or phase of the individual pilot reference points, nor does it calculate the amplitude and phase of individual pilots of each subsequent data symbol. Likewise, the pilot phase error metric 310 does not actually calculate the relative phase error of individual pilots of each data symbol compared to each pilot reference point. The pilot phase error metric 310 advantageously uses pre-signal detection combining techniques to combine the complex signal measurements (from the FFT operation) of the pilots to be used as the pilot reference points and the complex signal measurements of the pilots of each subsequent data symbol in such a way that a complex composite signal is generated prior to signal detection. This complex composite signal represents a weighted pilot phase error for the aggregate of the pilots of the Mth data symbol relative to the pilot reference points. Thus, the maximum likelihood phase error/weighting processor 406 determines the composite signals for the numerator and denominator of Eq. (14).

Furthermore, the phase error estimator 410 performs the signal detection by computing the arctangent in Eq. (14) to obtain the aggregate phase error for the $m^{th}$ data symbol. Thus, by advantageously combining the complex signal measurements in the maximum likelihood phase error/weighting processor 406 prior to the signal detection in the phase error estimator 410, a processing gain of approximately $10 \log_{10} n$ (where n is the number of pilots) is realized in comparison to performing signal detection on each individual pilot of the data symbol and then averaging them to obtain the aggregate phase error of the data symbol, e.g., approximately 6 dB in the 4 pilot case. In other words, signal detection on the individual pilots would amount to estimating the amplitude and phase of each pilot of the data symbol in order to determine a phase error for each pilot and then averaging the phase errors to determine the aggregate phase error for the entire data symbol. Thus, in one embodiment, the pilot phase error metric 310 performs pre-signal detection combining.

Additionally, as described above, the phase error estimator 410 determines the phase angle of the aggregate phase error $(\hat{\theta})_m$ or phase noise of the signaling, a potentially large portion of which is due to the phase noise contribution of the LO of the radio portion of the OFDM receiver. A preferred approach is to use a cordic-based arctangent method (see Eq. (14)) and an alternative approach is to use a small angle approximation (see Eq. (16)). The cordic-based arctangent approach does not require large bit-width multiplications. It only shifts and adds. The small angle approximation should be faster than the cordic-based arctangent approach, but it involves large bit width multiplication or division and is more prone to difficulties with the numerical dynamic range.

In one embodiment, the cordic-based arctangent approach is implemented such that the cordic iteration is performed between 8 and 15 times. Cordic-based arctangent methods are well known in the art, thus, no further explanation is required.

Thus, the phase error metric 310 advantageously provides a maximum likelihood estimation guided approach of the pilot phase error relative to the pilot reference points for all of the pilots of the OFDM symbols. According to this embodiment, it is important to track all of the pilots to reduce the effects of frequency selective fading across the OFDM symbols and reduce the variance of the estimator as well. For example, the phase may not change uniformly for all of the pilots as the channel conditions change. A single pilot may have the strongest SNR (e.g., the highest amplitude) and its phase changes noticeably from symbol to symbol; however, the phase of the other pilots may remain unchanged, or have changed only slightly, from symbol to symbol. These other pilots may also continue to have a lower amplitude than the amplitude of the strongest pilot. As such, due to frequency selective fading, the strongest pilot does not accurately reflect the phase characteristics of the entire OFDM data symbol. However, by tracking and performing a maximum likelihood based estimation using all of the pilots, a more accurate picture of the signal phase across the OFDM symbol is estimated such that the phase contribution due to the multipath and also introduced by the LO of the OFDM radios can be minimized. Furthermore, by keeping the phase error minimized, it is possible to use higher order modulations, such as 64-QAM or 256-QAM without severe performance degradation.

Further advantageously, a natural by-product of the maximum likelihood metric of this embodiment is that it also maximizes the effective SNR for the pilot symbols considered as a whole. The additional SNR allows enhanced phase noise tracking resulting in greater suppression of the LO phase noise.

Additionally, the quality estimator 408 calculates a measure of the pilot tracking loop's quality, which is required elsewhere in the signal processing of the OFDM receiver. A convenient measure is the total power present in the 4 pilot subcarriers of each symbol given by:

$$P_T = \sum_{k=0}^{3} [u_k^2 + v_k^2] \qquad \text{Eq. (18)}$$

Note that the quality estimator 408 may be integrated with the maximum likelihood phase error/weighting processor 406.

It is noted that Eqs. (12) through (16) and Eq. (18) are specifically for a waveform having 4 pilots (k=0,1,2 and 3); however, these equations may be written more generally for a waveform having n pilots with the summation term expressed as $$\sum_{k=0}^{n-1}.$$

Figure 5:
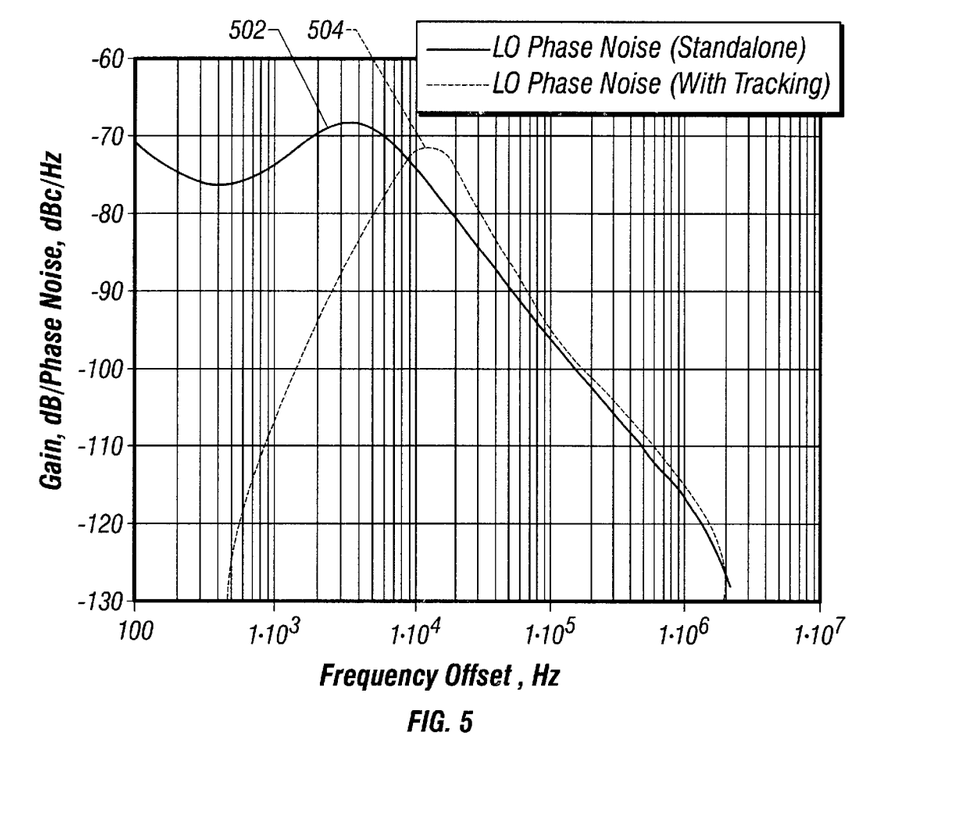
FIG. 5 is a graph illustrating the LO phase noise contribution vs. frequency using no pilot tracking and pilot tracking according to the embodiment of FIGS. 3 and 4.

Referring next to FIG. 5, a graph is shown illustrating the LO phase noise contribution vs. frequency offset in Hz using no pilot tracking and pilot tracking according to the embodiment of FIGS. 3 and 4. Line 502 represents the LO phase contribution without pilot tracking techniques. Note that the graph of FIG. 5 does not include channel additive Gaussian noise. For example, it is estimated that in an embodiment where the radio portion is highly integrated, the achievable phase noise performance in a free running on-chip VCO will be approximately −78 dBc/Hz at 10 kHz offset. Thus, with the IEEE 802.11a waveform, the integrated phase noise interfering with each subcarrier is on the order of 2.7 degrees rms, which is excessive for 64-QAM and above.

Line 504 represents the phase noise contribution of the LO of the radio portion with the pilot phase tracking of the embodiments described above, such that the phase noise contribution is significantly reduced, particular at lower frequency offsets. Thus, it is estimated that the integrated phase error interfering with each subcarrier can be substantially improved, the actual amount being a function of the signal constellation type and the prevailing channel SNR.

Figure 6:
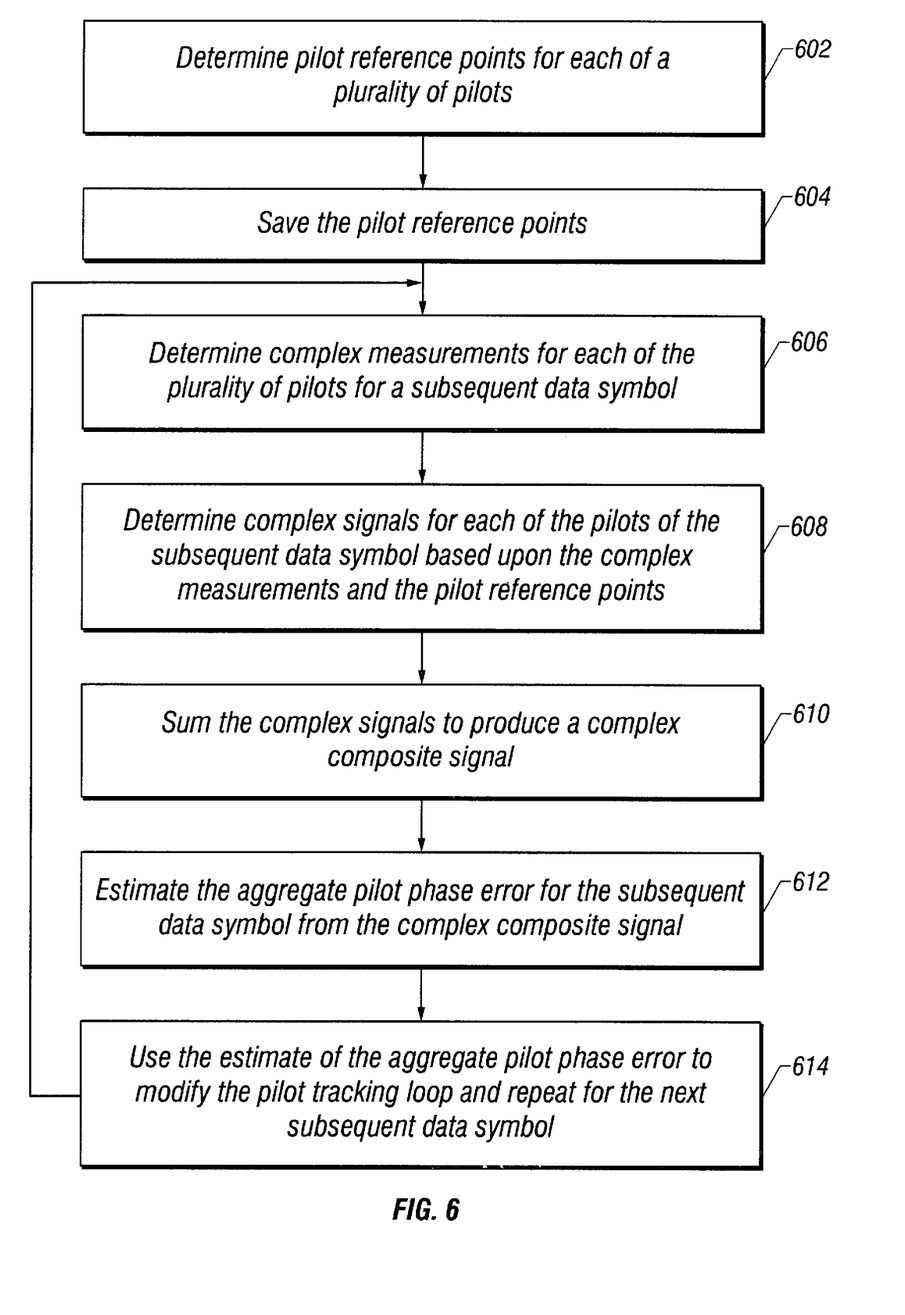
FIG. 6 is a flowchart of the steps performed in the pilot phase error metric of FIG. 4 in accordance with one embodiment of the invention.

Referring next to FIG. 6, a flowchart is shown for the steps performed by the pilot phase error metric in accordance with one embodiment of the invention. Initially, the pilot reference points are determined for each pilot subcarrier of the OFDM waveform (Step 602). These reference points $u_k$ and $v_k$ are the complex reference points within IQ space which represent the respective pilots and are determined, in one embodiment, by taking the output of the FFT operation for each of the pilots of the long symbol portion of the preamble of the IEEE 802.11a waveform. Thus, these pilot reference points are received into the pilot phase error metric 310 of FIG. 3. This is performed when the pilot tracking loop of FIG. 3 is not activated, for example, the switch 306 of FIG. 3 is in position A. Next, these reference points are saved (Step 604), for example, in the reference point storage of FIGS. 3 and 4.

Next, as the subsequent data symbols of the OFDM MAC frame enter the baseband processing portion of the OFDM receiver, the pilot tracking loop is activated (e.g., switch 306 of FIG. 3 is now in position B). As such, complex signal measurements are determined in the FFT operation for each of the plurality of pilots for a subsequent data symbol (Step 606). In one embodiment, these complex signal measurements are received at the pilot phase error metric of FIG. 3. This is done by taking the outputs of the frequency bins of the FFT operation corresponding to the respective pilot subcarriers.

Next, the pilot phase error metric performs pre-detection combining and computes a complex signal for each pilot of the subsequent data symbol based upon the pilot reference points and the complex signal measurements for the pilots of the subsequent data symbol (Step 608). For example, the complex signal for each pilot of the subsequent data symbol is given by Eq. (11). Next, the complex signals are summed to produce a complex composite signal (Step 610). For example, the complex composite signal for the subsequent data symbol is represented in Eq. (12). It is noted that the pilot phase error metric deals strictly with vectors and thus, no phase is actually determined at this point, i.e., signal detection has not yet occurred.

Next, the aggregate pilot phase error for the subsequent data symbol is estimated (Step 612). This estimate is obtained by determining the argument of the complex composite signal, for example, as given in Eq. (13). The argument of the complex composite signal is determined as guided by Eq. (6) in the phase error estimator 410 of FIG. 4 and may be done using a cordic-based arctangent approach (see Eq. (14)) or a small angle approximation approach (see Eqs. (15) and (16)). Note that signal detection occurs during Step 612, for example, in the arctangent operation. Thus, Steps 602 through 612 apply a pilot phase error metric based on a maximum likelihood-based estimation that advantageously tracks all of the pilots for each data symbol of the OFDM waveform.

It is noted that this estimate must be modified to remove the pseudo random modulation present on the pilots. For example, this is removed at the random pilot modulation removal 412 of FIG. 4, which uses the PN pilot modulation generator 312.

Next, the estimate of the aggregate phase error is used to modify the pilot tracking loop and then Steps 606 through 614 are repeated until the end of the MAC frame (Step 614). This is done by the updating the loop filter 314 of FIG. 3, which adjusts the NCO 316 of FIG. 3. The NCO 316 causes the phase rotator 302 of FIG. 3 to de-rotate the incoming baseband signal 116 to minimize the phase error of the next data symbols. Then Steps 606 through 614 are repeated for the next OFDM data symbol in an iterative fashion.

In one embodiment, Steps 602, 606, 608 and 610 are performed by the maximum likelihood phase error/weighting processor 406 of FIG. 4. Step 612 is performed by the phase error estimator 410 of FIG. 4. Conveniently, all of the calculations of the maximum likelihood phase error/weighting processor 406 are carried out in rectangular form to simplify the implementation.

The steps of FIG. 6 are typically performed as a set of instructions that are performed in dedicated hardware for optimum speed in the calculations or in software using a processor or other machine to execute the instructions to accomplish the given steps. Ideally, the steps of FIG. 6 are performed by the pilot tracking loop of the baseband processing portion of an OFDM receiver having a pilot phase error metric and utilizing the FFT operation of the OFDM receiver. Additionally, the baseband processing portion and the radio portion of the OFDM receiver may be integrated on to one or more devices or chips.

While the invention herein disclosed has been described by means of specific embodiments and applications thereof, numerous modifications and variations could be made thereto by those skilled in the art without departing from the scope of the invention set forth in the claims.

What is claimed is:

1. A method of pilot phase error estimation in an orthogonal frequency division multiplexed (OFDM) receiver comprising:

determining pilot reference points corresponding to a plurality of pilots of an OFDM preamble waveform; and estimating an aggregate phase error of a subsequent OFDM data symbol relative to the pilot reference points using complex signal measurements corresponding to each of the plurality of pilots of the subsequent OFDM data symbol and the pilot reference points;

wherein the estimating step comprises performing a maximum likelihood-based estimation using the complex signal measurements corresponding to each of the plurality of pilots of the subsequent OFDM data symbol and the pilot reference points.

2. The method of claim 1 wherein the estimating step is represented mathematically as:

$$\hat{\theta}_m = \tan^{-1}\left[\frac{\sum_{k=0}^{n-1}(u_k Q_{k,m} - v_k I_{k,m})}{\sum_{k=0}^{n-1}(u_k I_{k,m} + v_k Q_{k,m})}\right]$$

where $\hat{\theta}_m$ is the aggregate phase error for the subsequent OFDM data symbol having a time index m, wherein $u_k$ and $u_k$ represent in-phase (I) and quadrature (Q) values, respectively, for the pilot reference points for n pilots of the OFDM preamble waveform, and where $I_{k,m}$ and $Q_{k,m}$ represent the complex signal measurements corresponding to the $k^{th}$ pilot of the $m^{th}$ subsequent OFDM data symbol.

3. The method of claim 1 wherein the determining step comprises determining the pilot reference points corresponding to the plurality of pilots of a long symbol portion of the OFDM preamble waveform.

4. The method of claim 3 wherein the determining step further comprises obtaining complex signal measurements from bins of a Fourier transform corresponding to respective ones of the plurality of pilots of the long symbol portion of the OFDM preamble waveform.

5. The method of claim 1 further comprises determining the complex signal measurements corresponding to each of the plurality of pilots of the subsequent OFDM data symbol.

6. The method of claim 5 wherein the determining the complex signal measurements comprises obtaining the complex signal measurements from bins of a Fourier transform corresponding to respective ones of the plurality of pilots of the subsequent OFDM data symbol.

7. The method of claim 5 wherein the estimating step further comprises performing pre-signal detection combining to produce a complex composite signal.

8. The method of claim 7 wherein the performing step comprises calculating a complex signal for each of the plurality of pilots of the subsequent OFDM data symbol, wherein the complex signal for each of the plurality of pilots is calculated from a respective one of the pilot reference points and a respective one of the complex signal measurements.

9. The method of claim 8 wherein the performing step further comprises calculating the complex composite signal by summing complex signals for each of the plurality of pilots of the subsequent OFDM data symbol.

10. The method of claim 9 wherein the estimating step comprises estimating the aggregate phase error of the subsequent OFDM data symbol from the complex composite signal.

11. The method of claim 9 wherein the estimating step further comprises determining an argument of the complex composite signal, wherein the argument of the complex composite signal is based upon the maximum likelihood-based estimation.

12. The method of claim 11 wherein the determining the argument comprises estimating the aggregate phase error using a cordic-based arctangent on the real and the imaginary parts of the complex composite signal.

13. A pilot phase error metric in an orthogonal frequency division multiplexed (OFDM) receiver comprising:
means for determining pilot reference points corresponding to a plurality of pilots of an OFDM preamble waveform; and
means for estimating an aggregate phase error of a subsequent OFDM data symbol relative to the pilot reference points using complex signal measurements corresponding to each of the plurality of pilots of the subsequent OFDM data symbol and the pilot reference points;
wherein the means for estimating comprise means for performing a maximum likelihood-based estimation using the complex signal measurements corresponding to each of the plurality of pilots of the subsequent OFDM data symbol and the pilot reference points.

14. The pilot phase error metric of claim 13 wherein the means for determining comprise means for determining the pilot reference points corresponding to the plurality of pilots of a long symbol portion of the OFDM preamble waveform.

15. The pilot phase error metric of claim 14 wherein the means for determining further comprise means for obtaining complex signal measurements from bins of a Fourier transform corresponding to respective ones of the plurality of pilots of the long symbol portion of the OFDM preamble waveform.

16. The pilot phase error metric of claim 13 further comprising means for determining the complex signal measurements corresponding to each of the plurality of pilots of the subsequent OFDM data symbol.

17. The pilot phase error metric of claim 16 wherein the means for determining the complex signal measurements comprises obtaining the complex signal measurements from bins of a Fourier transform corresponding to respective ones of the plurality of pilots of the subsequent OFDM data symbol.

18. The pilot phase error metric of claim 18 wherein the means for estimating further comprise means for performing pre-signal detection combining to produce a complex composite signal.

19. The pilot phase error metric of claim 18 wherein the mean for performing comprise means for calculating a complex signal for each of the plurality of pilots of the subsequent OFDM data symbol, wherein the complex signal for each of the plurality of pilots is calculated from a respective one of the pilot reference points and a respective one of the complex signal measurements.

20. The pilot phase error metric of claim 19 wherein the means for performing further comprise means for calculating the complex composite signal by summing complex signals for each of the plurality of pilots of the subsequent OFDM data symbol.

21. The pilot phase error metric of claim 20 wherein the means for estimating comprise means for estimating the aggregate phase error of the subsequent OFDM data symbol from the complex composite signal.

22. The pilot phase error metric of claim 20 wherein the means for estimating further comprise means for determining an argument of the complex composite signal, wherein the argument of the complex composite signal is based upon the maximum likelihood-based estimation.

23. The pilot phase error metric of claim 22 wherein the means for determining the argument comprise means for estimating the aggregate phase error using a cordic-based arctangent on the real and the imaginary parts of the complex composite signal.

24. The pilot phase error metric of claim 13 wherein the means for estimating is represented mathematically as:

$$\hat{\theta}_m = \tan^{-1}\left[\frac{\sum_{k=0}^{n-1}(u_k Q_{k,m} - v_k I_{k,m})}{\sum_{k=0}^{n-1}(u_k I_{k,m} + v_k Q_{k,m})}\right]$$

where $(\hat{\theta})_m$ is the aggregate phase error for the subsequent OFDM data symbol having a time index m, wherein $u_k$ and $v_k$ represent in-phase (I) and quadrature (Q) values, respectively, for the pilot reference points for n pilots of the OFDM preamble waveform, and where $I_{k,m}$ and $Q_{k,m}$ represent the complex signal measurements corresponding to the $k^{th}$ pilot of the $m^{th}$ subsequent OFDM data symbol.

25. A pilot phase error metric for an orthogonal frequency division multiplexed (OFDM) receiver comprising:
   a reference point storage for storing pilot reference points corresponding to each of a plurality of pilots of an OFDM preamble waveform;
   a maximum likelihood phase error/weighting processor coupled to the reference point storage for processing complex signal measurements corresponding to each of a plurality of pilots of a subsequent OFDM data symbol in comparison to the pilot reference points from the reference point storage; and
   a phase error estimator coupled to the maximum likelihood phase error/weighting processor for estimating an aggregate phase error of the OFDM data symbol relative to the pilot reference points from the processed complex signal measurements and the pilot reference points.

26. The pilot phase error metric of claim 25 further comprising a pseudo random pilot phase modulation removal coupled to the phase error estimator.

27. The pilot phase error metric of claim 26 further comprising a pseudo random generator coupled to the pseudo random pilot phase modulation removal.

28. The pilot phase error metric of claim 25 further comprising a multiplexer coupled the maximum likelihood phase error/weighting processor for buffering the complex signal measurements corresponding to each of the plurality of pilots of the OFDM data symbol to the maximum likelihood phase error/weighting processor.

* * * * *